April 19, 1949.    L. LUISI    2,467,396
UNIVERSAL DRILL JIG
Filed Jan. 15, 1946    5 Sheets-Sheet 1
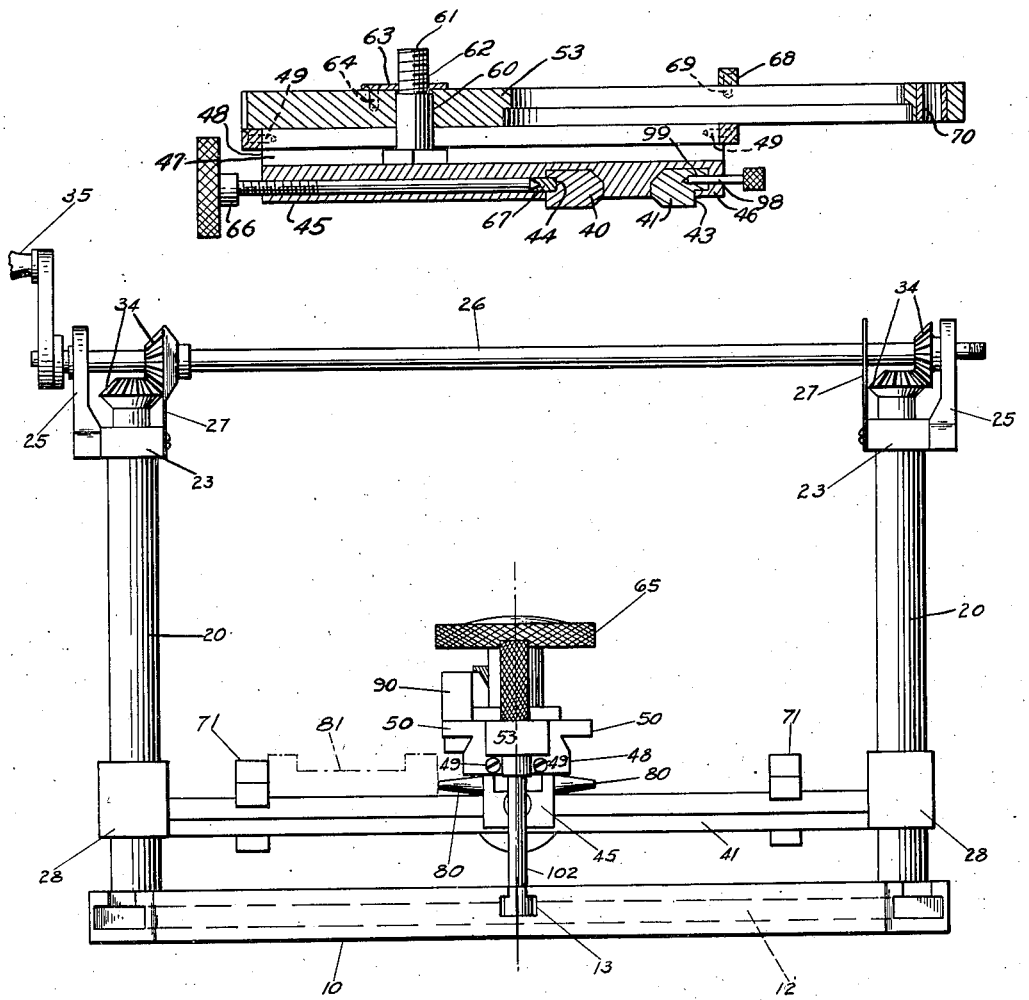
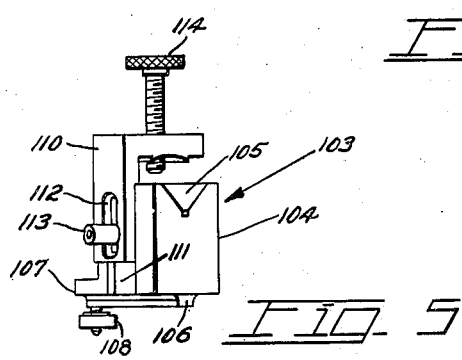
INVENTOR.
Luigi Luisi
BY
ATTORNEY

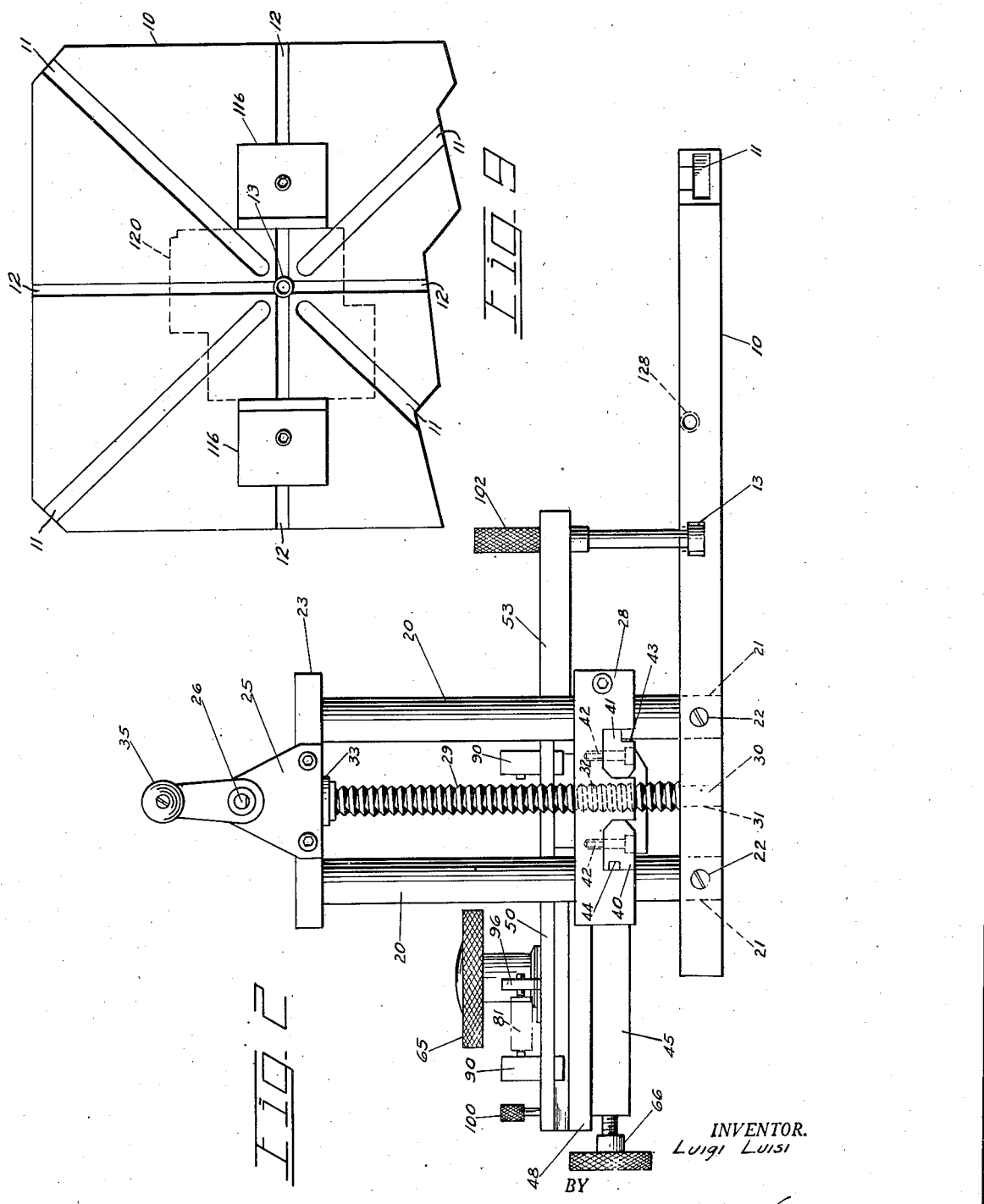

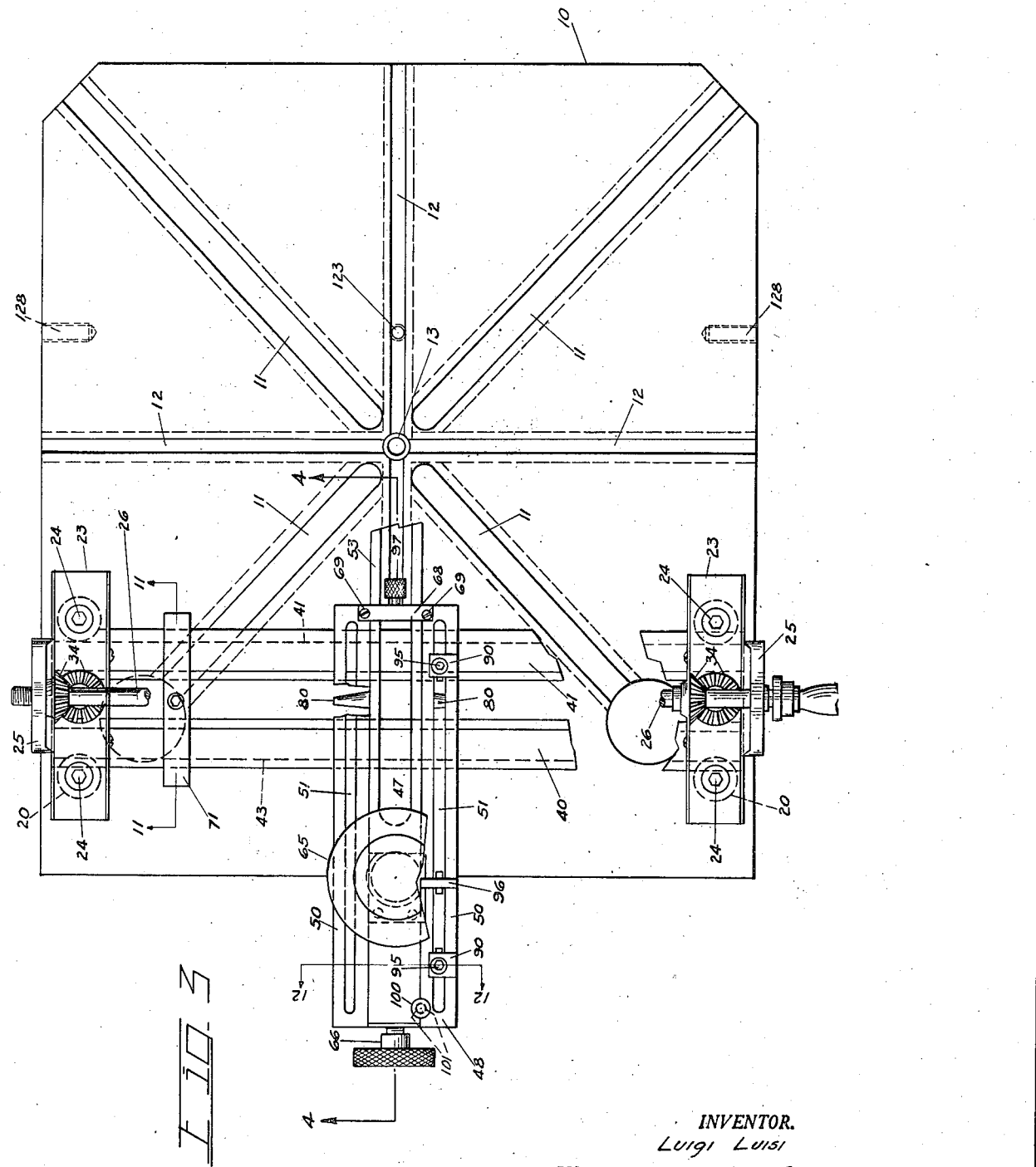

April 19, 1949. L. LUISI 2,467,396
UNIVERSAL DRILL JIG
Filed Jan. 15, 1946 5 Sheets-Sheet 4

INVENTOR.
Luigi Luisi
BY
ATTORNEY

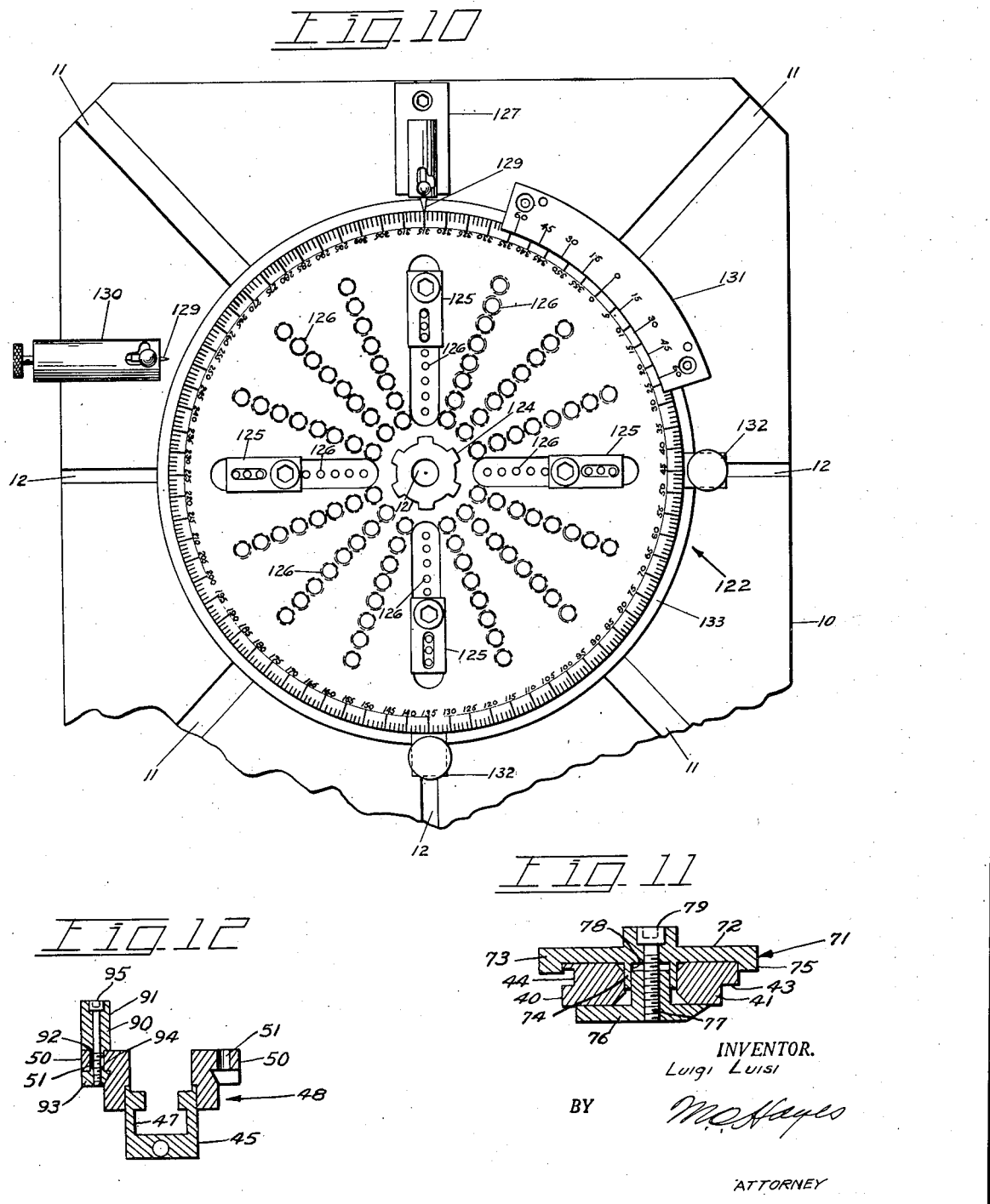

Patented Apr. 19, 1949

2,467,396

UNITED STATES PATENT OFFICE 2,467,396

UNIVERSAL DRILL JIG

Luigi Luisi, New York, N. Y.

Application January 15, 1946, Serial No. 641,371

4 Claims. (Cl. 77—62)

(Granted under the act of March 3, 1883, as amended April 30, 1928; 370 O. G. 757)

This invention relates to a universal drill jig for performing many types of precision drilling.

An object of this invention is to provide a jig in which the drill guide or bushing can be moved in three dimensions to accommodate a variety of work.

Another object is to provide a jig that permits drilling of various types of material such as castings, round or flat stock, round bars, square bars and tubing.

Further objects and advantags of this invention, as well as its construction, arrangement and operation, will be apparent from the following description and claims in connection with the accompanying drawings, in which Fig. 1 is a front elevation of the drill jig.

Fig. 2 is a side elevation of the drill jig.

Fig. 3 is a top plan view of the drill jig, parts being broken away for clarity of illustration.

Fig. 4 is a vertical sectional view of the carriage along the line 4—4 of Fig. 3.

Fig. 5 is an isometric view of a clamp.

Fig. 9 is a top plan view of the base plate as used with the clamps of Figs. 7 and 8.

Fig. 10 is a top plan view of the base plate as used for radially spaced drilling.

Fig. 11 is a vertical sectional view of a lower stop taken along the line 11—11 of Fig. 3.

Fig. 12 is a vertical sectional view of the carriage taken along the line 12—12 of Fig. 3.

Figure 6:
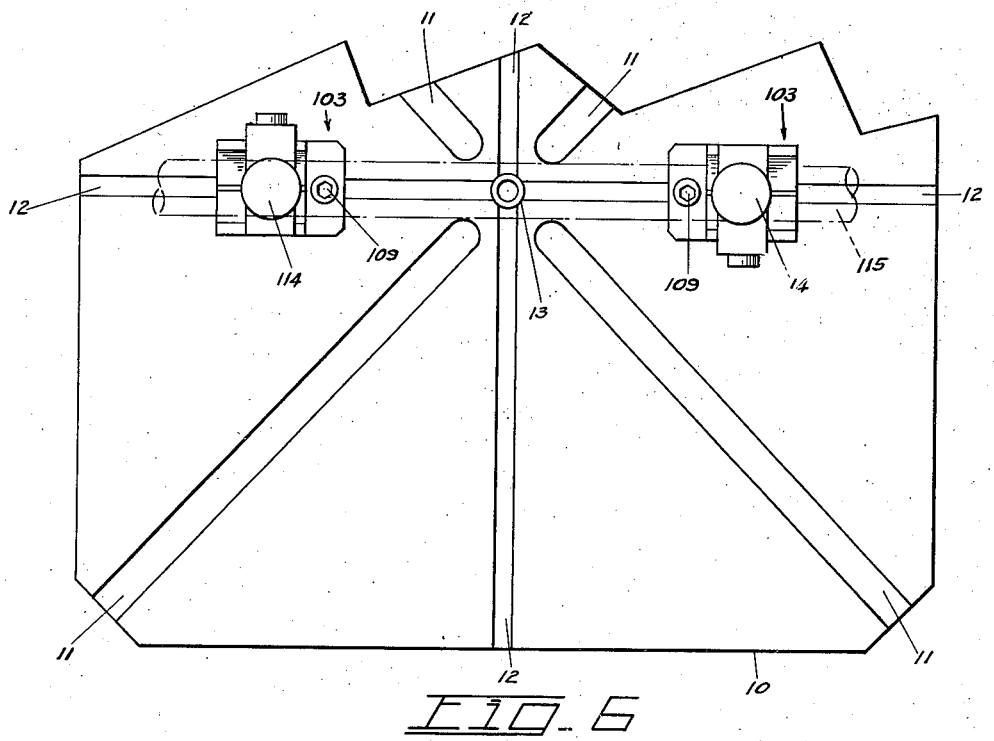
Fig. 6 is a top plan view of the base plate as used with clamps.

The preferred embodiment of the invention is illustrated in Figs. 1, 2, and 3 wherein the base plate of the precision drill jig is designated by the numeral 10. The base plate 10 is rectangular in shape and has diagonally cut therein slots 11 of an inverted T-shape in cross section. Slots 12, also of an inverted T-shape in cross section, are also cut in the base plate 10 parallel to the sides thereof and normal to each other. Slots 12 connect the mid points of the sides of the base 10. At the intersection of the slots 12 is a bushing 13 which is welded to the base plate 10 or otherwise secured.

At the left side of base 10, as viewed in Fig. 3, are pairs of parallel cylindrical guide bars 20 received in the bores 21 in the base plate 10 and held to the base plate 10 by means of screws 22. The upper ends of the guide bars 20 are connected by cross pieces 23 which are fastened to the guide bars 20 by means of screws 24. Attached to the sides of cross pieces 23 are vertical bearing members 25 which mount a spindle 26 therebetween. On the inner sides of cross pieces 23 are vertical bearing members 27 which also support the spindle 26.

Slidably mounted upon the guide bars 20 are vertically movable rail supports 28. Threadedly engaged with the rail supports 28 are lead screws 29 which are reduced in diameter, as at 30, for reception in bores 31 in the base 10. Lead screws 29 also pass through threaded bores 32 and cross pieces 28, a collar 33 being provided on each lead screw 29 for proper positioning of the lead screw 29. Mounted on the spindle 26 and on the top of lead screws 29 are beveled gears 34 which provide the drive for raising and lowering rail supports 28. A handle 35 is attached to one end of the spindle 26 for manual operation.

Extending between the two rail supports 28 is a pair of rails 40 and 41 attached to the rail supports 28 by means of screws 42. Rails 40 and 41 are beveled at their inner, upper corners, rail 41 being notched at its outer side, as at 43. The rail 40 at its outer side has a slot 44. Mounted upon the rails 40 and 41 and extending perpendicularly thereto is carriage 45 contoured to fit the shape of the rails. Carriage 45 has an inwardly extending lip 46 which extends under the lip on the outer side of rail 41, which lip is created by the notch 43. Carriage 45 has an inverted T-shaped slot 47 (Fig. 12). Mounted on the carriage 45 is an elongated member 48 of a general U-shape which is attached to the carriage 45 by means of screws 49. The elongated member 48 has lateral extensions 50 which are slotted at 51 to mount upper stops 90. Slidably mounted within the elongated member 48 is a slide 53.

Mounted in the bore 60 of the slide 53 is an inverted bolt 61, the upper end of which has a reduced diameter, as at 62, and which is held in place by means of a plate 63 attached to the slide 53 by means of screws 64, the head of the bolt 61 being received in the T slot 47 and the carriage 45. An enlarged nut 65 is threadedly received by the bolt 62 and is used to clamp the slide 53 as desired with respect to the carriage 45 and elongated member 48. Locking of the carriage 45 along the rails 40 and 41 is achieved by means of an elongated setscrew 66 in the carriage 45 which impinges upon a small wear plate 67 which in turn is received by the slot 44 in the rail 40. Vertical movement of the slide 53 in the elongated member 48 is prevented by means of a saddle 68 fastened across the elongated member 48 by means of screws 69. A drill guide or bushing 70 is provided at the outer extremity of the slide 53.

Mounted on the rails 40 and 41 on either side of the carriage 45 are adjustable stops 71 (Fig. 11) which comprise a horizontal piece 72 extending across the rails 40 and 41 and vertically depending pieces 73, 74, and 75, vertical piece 74 positioning the stop 71 by contact with the inner sides of the rails 40 and 41 while vertical pieces 73 and 75 position the stops 71 by contact with the outer sides of the rails 40 and 41. A bottom horizontal piece 76 straddles the lower side of the rails 40 and 41 and has a vertically extending piece 77 integral therewith which is received in a slot 78 of the vertical piece 74. A screw 79 is used to clamp the pieces 72 and 76 to the rails 40 and 41 as desired. Stops 71 are spaced as desired from the stops 80 which are integral with the carriage 45, spacing being regulated by means of accurately machined blocks as shown in phantom at 81 which fit between the rails 40 and 41, or by means of calipers, gauges, or other means for a purpose to be more fully described hereafter.

Within the slot 51 of the elongated member 48 are mounted adjustable stops 90 (Fig. 12) each of which comprises an upper piece 91 having a reduced portion 92 snugly received within the slot 51 and a lower piece 93 which straddles the underside of the slot 51 and has a reduced portion 94 extending vertically into the slot 51. Upper and lower pieces 91 and 93 are held together and clamped to the longated member 48 by means of screw 95. Upper stops 90 are spaced as required from the stop 96 which is integral with the plate 63, spacing being achieved by means of accurately machined blocks 81, calipers, gauges, or other means for a purpose to be more fully described.

The drill bushing 70 can be readily coaxially aligned with the bushing 13 of the base plate 10 by inserting a locating pin 97 (Fig. 4) into a bore 98 in the carriage 45 and also into a bore 99 in the rail 41, bores 98 and 99 being located in the same vertical plane as the longer of the T slots 12 in the base 10 and in the same vertical plane as the axis of the bushing 13. Proper positioning of the slide 53 to make the bushing 70 coaxial with the bushing 13 is achieved by inserting a centering pin 100 into a bore 101, extending half in the slide 53 and half in the elongated member 48. Checking of the coaxial relationship of the bushings 70 and 13 is achieved by means of pin 102 (Fig. 2) which can be passed through both bushings simultaneously.

Figs. 5 and 6 show the device in use for drilling round stock. For this operation clamps 103 in the shorter slot 12 are used. Each clamp 103 comprises a block 104 which has a notch 105 V-shape in cross section. Below block 104 is a guide rail 106 which is snugly received by the slot 12 in the base 10. Protruding lip 107 receives a nut 108 which in turn is held by the T slot 12, a screw 109 being used to fix the clamp 103 as desired in the slot 12. A vertically adjustable member 110 of inverted L-shape is slidably received in a channel 111 on one side of the block 104. The L-shaped member 110 has a slot 112 which rides on a screw 113 which fixes the position of the member 110 in height. A set screw 114 is used to clamp the material in place. The notch 105 readily centers the round stock 115 (shown in phantom) to be drilled. By inserting spacing blocks 81 of the required number and size between the stops 71 and 80, the carriage can be successively moved along the rails 40 and 41 as desired, a block 81 equivalent to the spacing of the holes to be drilled being removed after each operation. Similarly, the slide 53 can be positioned by placing the required number of proper blocks 81 between the stops 96 and 90. Here, too, a block is required after each bore is drilled.

Figure 7:
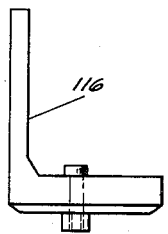
Fig. 7 is a side elevation of another type of clamp.
Figure 8:
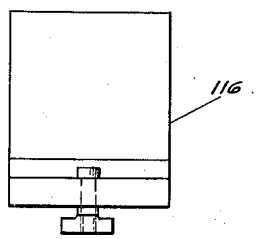
Fig. 8 is a front elevation of the clamp shown in Fig. 7.

In drilling irregularly shaped castings, as at 120, L-shaped clamps 116 fixed in the T slots 12, as illustrated in Figs. 7, 8, and 9, are used to hold the work in position. When annular or circular work is to be drilled, a spindle 121 is inserted in the bushing 13 and a graduated plate 122 is mounted thereon. For large work, the spindle 121 can be mounted in a bore 123 (see Fig. 3). In the case of annular work a centering piece 124 can be mounted on the spindle 121, the centering piece 124 being accurately machined to snugly fit the surface of a central bore in plate 122. Clamps 125 mounted in the tapped holes 126 can also be used to secure the work to the plate 122. For proper positioning of the plate 122 and the work thereon, latch 127 can be secured in the bores 128 (see Fig. 3). The bolts 129 of the latching devices are received by the notches corresponding to the graduations on the plate 122. These notches are too small to be seen in the drawings. When the plate 122 is mounted on the bore 123, latch 130 is used. A vernier 131 is mounted in one of the channels 11 whenever it is desired to rotate the plate 122 an amount less than one degree. Since the latches 127 and 130 are aligned only for even degrees, clamps 132 are provided to hold the plate 122 securely when the vernier 131 is used, clamps 132 contacting a lip or rim 133 on the periphery of the plate 122. Tapped holes 126 are conveniently spaced on the disc 122 as required for the reception of clamping devices whenever the contour of the work so requires.

In the operation of the device, the work is clamped in position as illustrated in Figs. 6 and 9, or between clamps 125 of Fig. 10. The drill guide bushing 70 is accurately located over the work by movement of the carriage 45 and the slide 53. Spacing blocks 81 are then placed between the stops 80 and 71 and between the stops 96 and 90 as required. The carriage 45 and slide 53 are then clamped in place and the work drilled. By unclamping the carriage 45 and slide 53, the bushing 70 can then be moved parallel to the rails 40 and 41 or normal thereto after the requisite number of blocks 81 have been removed. Stops 80 and 96 are then made to contact the remaining block or blocks 81 and the carriage 45 and slide 53 are again clamped into position after which the next succeeding drilling operation is performed. This process is continued until the entire drilling operation is completed.

It is to be understood that smaller bushings may be received in the bushing 70 when small diameter drills are used.

Changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A drill jig comprising a rectangular base, inverted T-shaped slots in said base, said slots radiating from a central point, a bushing at said central point, pairs of spaced vertical cylindrical guides at one end of said base, each of said pairs slidably mounting a rail support, a pair of rails between said rail supports, a pair of lead screws mounted in said base and threadedly received one by each of said rail supports, a cross piece connecting each pair of said vertical guides, said lead screws passing each through one of said cross pieces, bevel gears on each of said lead screws, bearings mounted on said cross pieces, a spindle in said bearings, bevel gears on said spindle meshing one with each of said first mentioned bevel gears, a handle on one end of said spindle, an elongated carriage on said rails, said carriage extending normal to said rails, adjustable stops on said rails on either side of said carriage, a setscrew in said carriage contacting one of said rails, said carriage having an inverted T slot therein, an elongated member on said carriage, said elongated member being U-shaped in cross section, said elongated member having a lateral extension, said lateral extension having a slot, adjustable stops in said slot, an elongated slide within said carriage and elongated member, a drill guide in one end of said slide, a bolt in the T slot of said carriage, said bolt extending through said slide, a nut on said bolt, a stop on said slide, said stop extending over said lateral extension, a spindle in said bushing, a disc mounted on said spindle, said disc being graduated peripherally, clamps on said disc, clamps on said base in engagement with said disc, and a vernier scale on said base for said disc.

2. A drill jig comprising a base, inverted T-shaped slots in said base, said slots radiating from a central point, pairs of spaced vertical guides at one end of said base, each of said pairs slidably mounting a rail support, a pair of rails between said rail supports, a pair of lead screws mounted in said base and threadedly received one by each of said rail supports, a cross piece connecting each pair of said vertical guides, said lead screws passing each through one of said cross pieces, bevel gears on each of said lead screws, bearings mounted on said cross pieces, a spindle in said bearings, bevel gears on said spindle meshing one with each of said first mentioned bevel gears, a handle on one end of said spindle, an elongated carriage on said rails, said carriage extending normal to said rails, adjustable stops on said rails on either side of said carriage, a setscrew in said carriage contacting one of said rails, said carriage having an inverted T slot therein, an elongated member on said carriage, said elongated member being U-shaped in cross section, said elongated member having a lateral extension, said lateral extension having a slot, adjustable stops in said slot, an elongated slide within said carriage and elongated member, a drill guide in one end of said slide, a bolt in the T slot of said carriage, said bolt extending through said slide, a nut on said bolt, and a stop on said slide, said stop extending over said lateral extension.

3. A drill jig comprising a base, adjustable work-securing means on said base, pairs of spaced vertical guides at one end of said base, each of said pairs slidably mounting a rail support, a pair of rails between said rail supports, a pair of lead screws mounted in said base and threadedly received one by each of said rail supports, a cross piece connecting each pair of said vertical guides, said lead screws passing each through one of said cross pieces, bevel gears on each of said lead screws, a spindle mounted between said cross pieces, bevel gears on said spindle meshing one with each of said first mentioned bevel gears, a handle on one end of said spindle, a carriage on said rails, said carriage extending normal to said rails, adjustable stops on said rails on either side of said carriage, means for locking said carriage in selected position on said rails, said carriage having a U-shaped portion and a lateral extension, said lateral extension having a slot, adjustable stops in said slot, an elongated slide within said carriage, a drill guide in one end of said slide, and a stop in said slide, said stop extending over said lateral extension.

4. A drill jig comprising a base, adjustable work-securing means on said base, spaced vertical guides at one end of said base, each of said guides slidably mounting a rail support, a rail between said rail supports, lead screws mounted in said base and threadedly received by said rail supports, cross pieces connected with said vertical guides, said lead screws passing through said cross pieces, gears on said lead screws, a spindle mounted between said cross pieces, gears on said spindle meshing with said first mentioned gears, a handle on one end of said spindle, a carriage on said rail, said carriage extending to said rail, adjustable stops on said rail on either side of said carriage, means for locating said carriage in selected position on said rail, said carriage having a portion shaped to receive a slide and having a lateral portion, said lateral portion having stop-supporting means, adjustable stops on said stop-supporting means, an elongated slide on said carriage portion, a drill guide in one end of said slide, and stop means on said slide extending toward said last named adjustable stops.

LUIGI LUISI.

REFERENCES CITED

The following references are of record in the file of this patent:

UNITED STATES PATENTS

| Number | Name | Date |
|---|---|---|
| 1,258,137 | Neth | Mar. 5, 1918 |
| 1,335,347 | Maulds | Mar. 30, 1920 |
| 2,061,718 | Stahl | Nov. 24, 1936 |
| 2,338,530 | Ognihene et al | Jan. 4, 1944 |
| 2,383,201 | Kruchten | Aug. 21, 1945 |
| 2,407,769 | Anderson | Sept. 17, 1946 |